United States Patent
Nakajima

(10) Patent No.: US 10,015,045 B2
(45) Date of Patent: Jul. 3, 2018

(54) COMMUNICATION APPARATUS THAT DELAYS A START OF DATA COMMUNICATION BASED ON INFORMATION OBTAINED FROM ANOTHER COMMUNICATION APPARATUS, METHOD FOR CONTROLLING THE SAME, AND NON-TRANSITORY COMPUTER READABLE STORAGE MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 14/526,594

(22) Filed: Oct. 29, 2014

(65) Prior Publication Data

US 2015/0139029 A1 May 21, 2015

(30) Foreign Application Priority Data

Nov. 18, 2013 (JP) ................................. 2013-238268

(51) Int. Cl.

| | |
|---|---|
| *H04W 72/04* | (2009.01) |
| *H04L 29/12* | (2006.01) |
| *H04L 12/24* | (2006.01) |
| *H04N 1/00* | (2006.01) |
| *G06F 3/12* | (2006.01) |
| *H04W 76/10* | (2018.01) |
| *H04W 76/02* | (2009.01) |
| *H04N 1/327* | (2006.01) |
| *H04N 101/00* | (2006.01) |

(Continued)

(52) U.S. Cl.
CPC .......... *H04L 41/0806* (2013.01); *H04L 67/16* (2013.01); *H04N 1/00204* (2013.01); *H04N 1/00278* (2013.01); *H04N 1/32702* (2013.01); *H04W 76/02* (2013.01); *H04W 76/10* (2018.02); *H04L 29/08648* (2013.01); *H04L 61/103* (2013.01); *H04L 61/2015* (2013.01); *H04L 61/2046* (2013.01); *H04L 69/28* (2013.01); *H04N 2101/00* (2013.01); *H04N 2201/0015* (2013.01); *H04N 2201/0041* (2013.01); *H04N 2201/0055* (2013.01)

(58) Field of Classification Search
None
See application file for complete search history.

(56) References Cited

U.S. PATENT DOCUMENTS

| | | | |
|---|---|---|---|
| 4,773,080 A | 9/1988 | Nakajima et al. | 375/5 |
| 4,862,282 A | 8/1989 | Nakajima | 358/400 |

(Continued)

OTHER PUBLICATIONS

"Wi-Fi Certified Wi-Fi Direct", http://blog.broadcom.com/wp-content/uploads/2013/10/Wi-Fi-Direct-White-Paper.pdf, Oct. 2010, pp. 1-6.

*Primary Examiner* — Charles C Jiang
*Assistant Examiner* — George Atkins, Jr.
(74) *Attorney, Agent, or Firm* — Fitzpatrick, Cella, Harper & Scinto

(57) ABSTRACT

A communication apparatus, comprises a forming unit configured to form a wireless network with another communication apparatus; and a control unit configured to control a start timing of data communication with the other communication apparatus based on role information of the communication apparatus in the wireless network.

12 Claims, 9 Drawing Sheets

(51) Int. Cl.
  *H04L 29/08*  (2006.01)
  *H04L 29/06*  (2006.01)

(56)              References Cited

U.S. PATENT DOCUMENTS

| | | | |
|---|---|---|---|
| 5,073,827 A | 12/1991 | Nakajima | 358/437 |
| 5,287,402 A | 2/1994 | Nakajima | 379/100 |
| 5,392,133 A | 2/1995 | Nakajima | 358/407 |
| 5,684,604 A | 11/1997 | Nakajima et al. | 358/434 |
| 5,696,598 A | 12/1997 | Yoshida et al. | 358/434 |
| 5,726,777 A | 3/1998 | Yoshida et al. | 358/500 |
| 5,739,920 A | 4/1998 | Nakajima et al. | 358/426 |
| 2003/0088650 A1* | 5/2003 | Fassold | G06F 8/63 709/220 |
| 2007/0050532 A1* | 3/2007 | Ochiai | H04L 29/12028 711/100 |
| 2009/0307371 A1* | 12/2009 | Okazaki | H04L 29/12028 709/233 |
| 2010/0082789 A1* | 4/2010 | Kim | H04L 29/12216 709/223 |
| 2010/0188975 A1* | 7/2010 | Raleigh | G06Q 10/06375 370/230.1 |
| 2013/0198408 A1* | 8/2013 | Blair | H04L 61/103 709/237 |
| 2013/0343350 A1* | 12/2013 | Weinrib | H04B 7/2643 370/336 |
| 2015/0113052 A1* | 4/2015 | Chen | H04L 67/16 709/203 |

\* cited by examiner

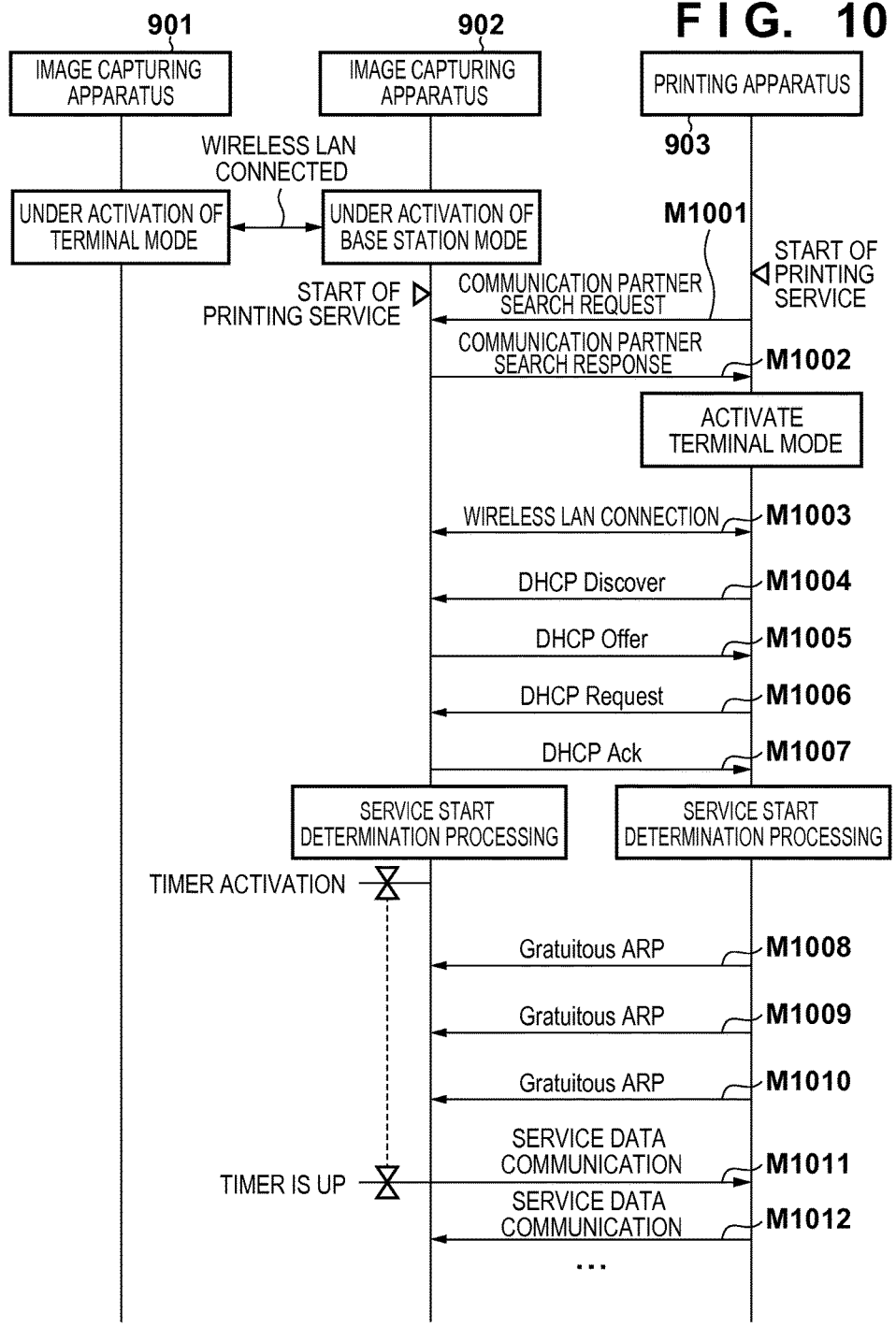

COMMUNICATION APPARATUS THAT DELAYS A START OF DATA COMMUNICATION BASED ON INFORMATION OBTAINED FROM ANOTHER COMMUNICATION APPARATUS, METHOD FOR CONTROLLING THE SAME, AND NON-TRANSITORY COMPUTER READABLE STORAGE MEDIUM

BACKGROUND OF THE INVENTION

Field of the Invention

The present invention relates to a communication apparatus, a method for controlling the same, and a non-transitory computer-readable storage medium.

Description of the Related Art

In recent years, a wireless LAN (Local Area Network) is being mounted in a terminal device such as a cellular phone, digital camera, or printing apparatus in addition to a PC (Personal Computer).

The connection forms of wireless LAN devices include an infrastructure mode in which a terminal performs communication under the control of a base station via the base station and an ad hoc mode in which terminals directly communicate with each other.

The base station is generally necessary when communicating in the infrastructure mode. However, there is proposed a technique in which a portable base station function is imparted to a terminal in an environment having no base station to implement communication in the infrastructure mode between terminals. The Wi-Fi Alliance as the wireless LAN industrial group standardizes Wi-Fi Direct™ which defines the specification for implementing direct communication between terminals using the terminal having the portable base station function (see "Wi-Fi Peer-to-Peer (P2P) Technical Specification Version 1.1", Wi-Fi Alliance, 2010).

Wi-Fi Direct™ describes a method of deciding a device operating as a portable base station, a method of setting parameters for connecting to a device serving as the portable base station, and a connection method between terminals complying with the specification.

Wi-Fi Direct™ defines the device operating as the portable base station as P2P (Peer-to-Peer) GO (Group Owner) and a terminal device connecting to the P2P GO as a P2P Client. In the method of deciding the P2P GO, capability information is exchanged between the terminals to decide a device serving as the P2P GO. The device decided as the P2P GO activates the portable base station function to establish a wireless LAN network. The P2P Client executes wireless LAN parameter setting by WPS (Wi-Fi Protected Setup) with the wireless LAN network established by the P2P GO, thereby performing automatic connection. Accordingly, the P2P GO and the P2P Client form a wireless LAN network called a P2P group. Direct communication can be performed by the wireless LAN between the P2P GO and the P2P Client in the P2P group.

After the direct communication by the wireless LAN becomes possible, the P2P Client performs IP (Internet Protocol) address obtaining processing to the P2P GO. The IP address obtaining processing is executed using the DHCP (Dynamic Host Configuration Protocol) client function.

Similarly, the P2P GO activates the DHCP server function and distributes an IP address by DHCP in response to the IP address obtaining request from the P2P Client. When activating the DHCP server function, the P2P GO sets the local IP address in a network I/F (Interface).

When the P2P Client obtains the IP address by the DHCP client function, the P2P Client sets the obtained IP address in the network I/F, thereby allowing IP communication.

Depending on terminal types, overlap confirmation processing to determine whether the obtained IP addresses overlap in the network must be performed after obtaining the IP addresses and before setting the IP addresses in the network I/F.

The IP address overlap confirmation processing can be executed using the Gratuitous ARP (Address Resolution Protocol) (to be referred to as GARP hereinafter). Unlike the general ARP, the GARP is transmitted after the local IP address is set in the Target Address Protocol field of an ARP packet. If devices in which identical IP addresses are set exist in a network, an ARP Reply is sent back to the GARP transmission source as a response to the GARP serving as an ARP Request from the device. The presence/absence of the response to the GARP allows IP address overlap confirmation.

However, in the overlap confirmation of IP addresses obtained by the DHCP, the GARP transmission count and the like are not defined. The GARP transmission count and its period are implementation-dependent.

It can be assumed that a specific service is executed between the P2P Go and the P2P Client after forming the P2P group. The services are exemplified as a printing service, an image exchange service, and the like. Even if the P2P GO serves as the start side of data communication for a service and starts the data communication for the service immediately after IP address distribution processing, the P2P Client may be executing the IP address overlap confirmation.

When the P2P Client executes the IP address overlap confirmation before setting the IP address in the network I/F, the P2P Client cannot receive data for the service, and the data must be retransmitted.

The data retransmission count, the transmission timeout, and the like may be set depending on types of services. For this reason, the retransmission count may reach a default value or the transmission timeout may occur, thus failing data communication for a service.

In consideration of the above problems, the present invention provides a technique for preventing mismatching between the start timings of data communication for a service with a partner communication apparatus and suppressing the occurrence of data retransmission and transmission timeout.

SUMMARY OF THE INVENTION

According to one aspect of the present invention, there is provided a communication apparatus, comprising: a forming unit configured to form a wireless network with another communication apparatus; and a control unit configured to control a start timing of data communication with the other communication apparatus based on role information of the communication apparatus in the wireless network.

Further features of the present invention will become apparent from the following description of exemplary embodiments with reference to the attached drawings.

BRIEF DESCRIPTION OF THE DRAWINGS

FIG. 10 is a sequence chart between apparatuses to show processing until services are executed between an image capturing apparatus 901, an image capturing apparatus 902, and a printing apparatus 903 according to the second embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)
<1. Arrangement of Communication System>

Figure 1:
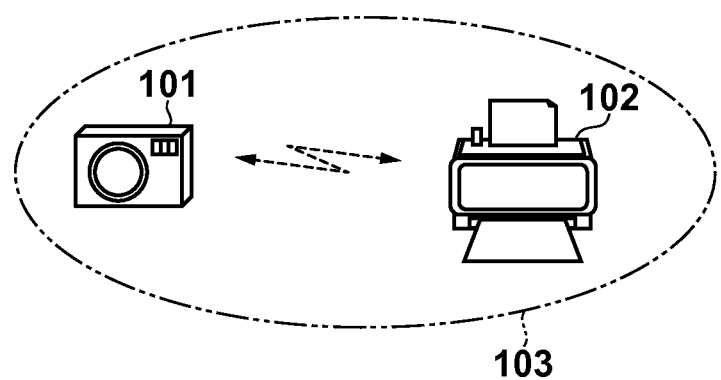
FIG. 1 is a view showing an example of the arrangement of a communication system according to the first embodiment.

An example of the arrangement of a communication system according to the first embodiment will be described with reference to FIG. 1. The communication system includes an image capturing apparatus 101 and a printing apparatus 102. A wireless network 103 is formed between the image capturing apparatus 101 and the printing apparatus 102.

The image capturing apparatus 101 and the printing apparatus 102 each have a wireless LAN function. The image capturing apparatus 101 and the printing apparatus 102 each also have a Wi-Fi Direct function, and are compatible with communication processing based on the Wi-Fi Direct protocol. The wireless LAN network (P2P group) 103 is formed using the Wi-Fi Direct function.

The image capturing apparatus 101 and the printing apparatus 102 each have a DHCP server function (a function operating on the server side) of distributing an IP address by the DHCP and a DHCP client function (a function operating on the client side) for obtaining an IP address.

This embodiment will exemplify a printing service as a service executed after the P2P group is formed. Note that the following description will be made assuming that the image capturing apparatus 101 is the data communication start side for a service in the printing service and the printing apparatus 102 is the data communication start receiving side for the service. The data communication start side and the data communication start receiving side change depending on services and devices and are not limited to the above case.

<2. Arrangement of Image Capturing Apparatus>

The functional block diagram of the image capturing apparatus 101 according to the first embodiment will be described below with reference to FIG. 2. The image capturing apparatus 101 includes an image capturing unit 201, an image processing unit 202, an operation unit 203, a display unit 204, a power supply unit 205, a control unit 206, a storage unit 207, a transmission/reception unit 208, an antenna 209, a wireless LAN control unit 210, a wireless network forming unit 211, a base station mode operation unit 212, a terminal mode operation unit 213, a service start determination unit 214, a service processing unit 215, an ARP processing unit 216, a DHCP service unit 217, a DHCP client unit 218, and a service start information obtaining unit 219.

The image capturing unit 201 is formed from a CCD (Charge Coupled Device), a lens, and the like. The image processing unit 202 executes image processing of an image and the like captured by the image capturing unit 201. The operation unit 203 accepts processing for operating the image capturing apparatus 101 and includes operation buttons and the like. The display unit 204 is formed from an LCD (Liquid Crystal Display), an LED (Light Emitting Diode), and the like and outputs information recognizable by vision using various types of display modes.

The power supply unit 205 supplies a power supply voltage to the image capturing apparatus 101. The control unit 206 controls the overall operation of the image capturing apparatus 101 by executing control programs stored in the storage unit 207. The storage unit 207 stores control programs executed by the control unit 206 and various kinds of information such as wireless LAN communication parameters and partner communication apparatus information. Various kinds of operations to be described later are performed by causing the control unit 206 to execute control programs stored in the storage unit 207.

The transmission/reception unit 208 performs transmission/reception control in accordance with the communication data protocol of each layer. The antenna 209 is an antenna for performing wireless LAN communication. The wireless LAN control unit 210 performs wireless LAN RF control, wireless LAN communication processing, and various control operations of the wireless LAN complying with the IEEE802.11 series. The wireless LAN control unit 210 also performs the Wi-Fi Direct related protocol processing and driving control.

The wireless network forming unit 211 forms the wireless network. The base station mode operation unit 212 operates as the base station in the wireless LAN when the image capturing apparatus 101 plays a role of the P2P GO in the Wi-Fi Direct. The terminal mode operation unit 213 operates such that the image capturing apparatus 101 serves as a P2P Client in the Wi-Fi Direct or a terminal station in the wireless LAN. The image capturing apparatus 101 operates as one of the base station mode operation unit 212 and the terminal mode operation unit 213 and executes processing for forming the wireless network (P2P group).

After the wireless network is formed, the service start determination unit 214 determines whether to start a service. The service processing unit 215 executes processing of various kinds of services executable by the image capturing apparatus 101. An example of the service is a printing service. This embodiment will exemplify the printing service but is not limited to this. Note that in this embodiment, to perform the printing service, the image capturing apparatus 101 operates as the data communication start side of the printing service.

The ARP processing unit 216 performs ARP related protocol processing. The DHCP server unit 217 executes IP address assignment to the Client to be connected to the wireless LAN network during operation in the base station mode. The DHCP client unit 218 executes IP address obtaining processing to the base station in the wireless LAN network during operation in the terminal mode.

The service start information obtaining unit 219 obtains information about the service start timing from the partner communication apparatus of the service. As the determination method for starting the service, the service start determination unit 214 may use service start timing information obtained from the service start information obtaining unit 219.

Note that the functional block arrangement is merely an example, but the plurality of function blocks may be arranged as one functional block. Alternatively, any functional block may be arranged into a plurality of further functional blocks.

<3. Arrangement of Printing Apparatus>

The functional block diagram of the printing apparatus 102 according to the first embodiment will be described with reference to FIG. 3. The printing apparatus 102 includes a printing processing unit 301, an image processing unit 302, an operation unit 303, a display unit 304, a power supply unit 305, a control unit 306, a storage unit 307, a transmission/reception unit 308, an antenna 309, a wireless LAN control unit 310, a wireless network forming unit 311, a base station mode operation unit 312, a terminal mode operation unit 313, a service start determination unit 314, a service processing unit 315, an ARP processing unit 316, a DHCP server unit 317, a DHCP client unit 318, and a service start information obtaining unit 319.

The printing processing unit 301 executes printing processing based on a printing instruction. The printing processing unit 301 also executes paper feed and paper discharge processing operations. The image processing unit 302 executes image processing of images obtained from the image capturing apparatus 101. The operation unit 303 accepts processing for operating the printing apparatus 102. The operation unit 303 includes operation buttons and the like for inputs to the printing apparatus 102. The display unit 304 is formed from an LCD, an LED, and the like and outputs information recognizable by vision using various kinds of display modes.

The power supply unit 305 supplies a power supply voltage to the printing apparatus 102. The control unit 306 controls the overall operation of the printing apparatus 102 by executing control programs stored in the storage unit 307.

The storage unit 307 stores the control programs executed by the control unit 306. Various kinds of operations to be described later are performed by causing the control unit 306 to execute the control programs stored in the storage unit 307. The respective processing units from the transmission/reception unit 308 to the service start determination unit 314 and the respective processing units from the ARP processing unit 316 to the service start information obtaining unit 319 have the same functions as those from the transmission/reception unit 208 of the image capturing apparatus 101 to the service start determination unit 214 and those from the ARP processing unit 216 to the service start information obtaining unit 219, and a detailed description thereof will be omitted.

The service processing unit 315 executes processing of various kinds of services executable by the printing apparatus 102. An example of the service is a printing service. This embodiment will exemplify the printing service, but is not limited to this. Note that in this embodiment, to perform the printing service, the printing apparatus 102 operates as the data communication start reception side of the printing service.

Note that the functional block arrangement is merely an example, but the plurality of function blocks may be arranged as one functional block. Alternatively, any functional block may be arranged into a plurality of further functional blocks.

<4. Processing Executed by Image Capturing>Apparatus and Printing Apparatus

The sequences of processing executed by the image capturing apparatus 101 and the printing apparatus 102 according to the first embodiment will be described with reference to FIGS. 4 to 6.

Figure 4:
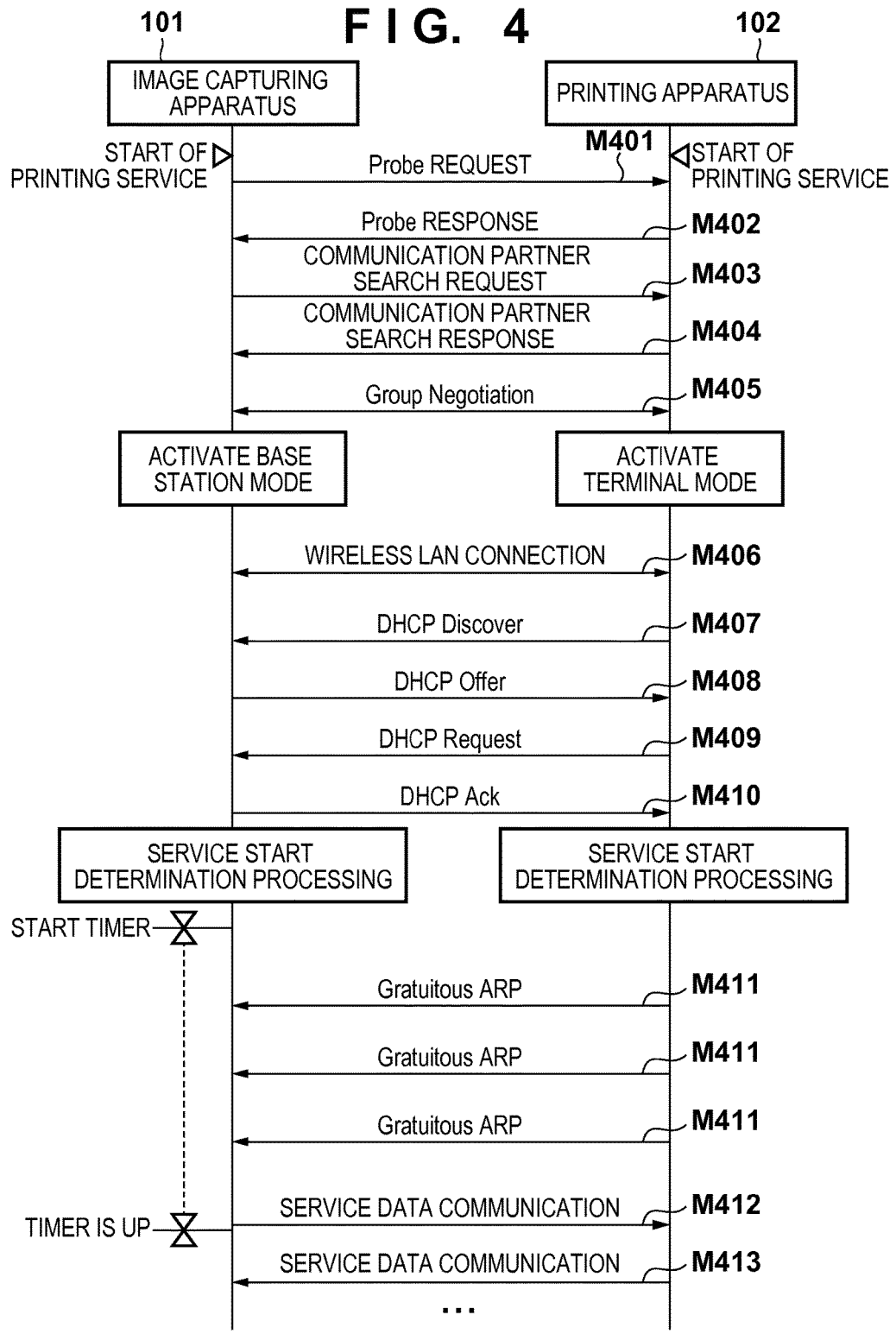
FIG. 4 is a sequence chart of the start of a printing service between the image capturing apparatus 101 and the printing apparatus 102 according to the first embodiment.
Figure 5:
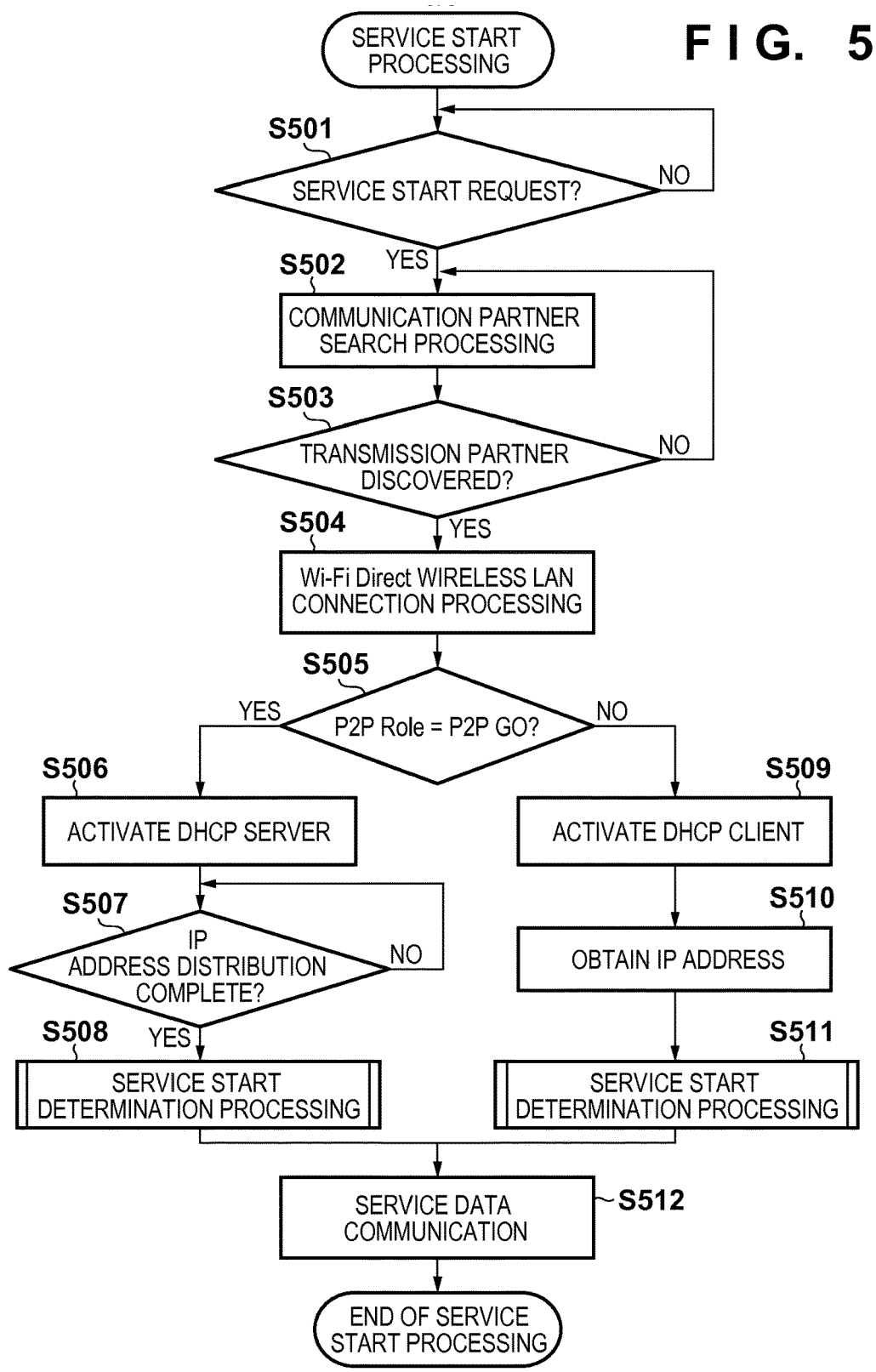
FIG. 5 is a flowchart showing the sequence of service start processing executed by the image capturing apparatus 101 and the printing apparatus 102 according to the first embodiment.

FIG. 4 is the sequence chart between apparatuses to show processing until services are to be performed between the image capturing apparatus 101 and the printing apparatus 102 according to the first embodiment. FIG. 5 is a flowchart showing the sequence of service start processing executed by the image capturing apparatus 101 and the printing apparatus 102 according to the first embodiment. FIG. 6 is a flowchart showing the sequence of service start determination processing executed by the image capturing apparatus 101 and the printing apparatus 102 according to the first embodiment.

[Service Start Processing]

First of all, the service start processing will be described in detail with reference to FIGS. 4 and 5. Before M401 of FIG. 4, the image capturing apparatus 101 and the printing apparatus 102 accept a printing service start instruction from a user. More specifically, in step S501 of FIG. 5, the service processing units 215 and 315 of the image capturing apparatus 101 and the printing apparatus 102 determine whether to accept the service start request. If it is determined that the service start request is accepted (YES in step S501), the process advances to step S502. If it is determined that the service start request is not accepted (NO in step S501), the process waits.

In step S502, the image capturing apparatus 101 and the printing apparatus 102 execute search processing for a communication partner of a service to start. Both the image capturing apparatus 101 and the printing apparatus 102 may perform the search processing. One of the apparatuses may serve as the search executing side, and the other may serve as the search waiting side to wait for the search instruction from the partner apparatus. In this embodiment, a description will be made in which the image capturing apparatus 101 serves as the search executing side, and the printing apparatus 102 serves as the search waiting side.

More specifically, as shown in FIG. 4, first, the image capturing apparatus 101 executes wireless LAN SCAN processing. As SCAN processing, a Probe request message (M401) is transmitted, and a Probe response message (M402) is received. After the wireless LAN SCAN processing, search processing for a communication partner is executed. The search processing for the communication partner complies with the Wi-Fi Direct processing. In the search processing for the communication partner, a communication partner search request message (M403) is transmitted to the partner communication apparatus discovered in SCAN processing in order to obtain information indicating whether the partner communication apparatus is compatible with a desired service.

Whether the partner communication apparatus is compatible with the desired service can be obtained using a Service Discovery function defined in the Wi-Fi Direct. For example, a Service Discovery Request is transmitted as a request message. In this embodiment, the Service Discovery Request containing information for requesting information indicating whether the partner communication apparatus is compatible with the printing service is transmitted. The printing apparatus 102 sends back a communication partner search response message (M404) in response to the communication partner search request message (M403). For example, a Service Discovery Response is sent back as the response message.

Since the printing apparatus 102 is compatible with the printing service in this embodiment, the response message containing information indicating compatibility with the printing service is transmitted. Note that the search request message and the search response message may contain information indicating that one of the image capturing apparatus 101 and the printing apparatus 102 serves as the service communication start side in addition to compatibility/incompatibility with the service. The method of obtaining information about compatibility/incompatibility with the service and the communication start of the service is not limited to a method using the Service Discovery function. Another method may be used. For example, information of the partner communication apparatus may be stored in advance, and determination may be performed based on this information.

In step S503, the image capturing apparatus 101 and the printing apparatus 102 determine whether a partner communication apparatus in which a desired service can be performed is discovered. If it is determined that the partner communication apparatus is discovered (YES in step S503), the process advances to step S504. On the other hand, it is determined that the partner communication apparatus is not discovered (NO in step S503), the process returns to step S502 to execute search processing for the partner communication apparatus again. According to this embodiment, search processing (M401-M404) for the partner communication apparatus is executed to cause the image capturing apparatus 101 and the printing apparatus 102 to discover (recognize) the printing apparatus 102 and the image capturing apparatus 101 as the printing service partner communication apparatuses. In step S504, wireless LAN connection processing based on the Wi-Fi Direct protocol is executed. Role decision for deciding one of the communication apparatuses as the P2P GO and the other as the P2P Client is performed by Group Negotiation (M405) in the Wi-Fi Direct protocol. Autonomously the local apparatus (for example, the image capturing apparatus 101) may serve as the P2P GO. In this case, the Group Negotiation processing can be skipped. In this embodiment, it is decided that the image capturing apparatus 101 operates as the P2P GO and the printing apparatus 102 operates as the P2P Client. The image capturing apparatus 101 activates the base station mode, and the printing apparatus 102 activates the terminal station mode. The image capturing apparatus 101 establishes the wireless network 103, and the printing apparatus 102 is connected to the wireless network 103 via the wireless LAN (M406). The wireless LAN connection is performed along with the Wi-Fi Direct specification. When the wireless LAN connection processing ends, the process advances to step S505.

In step S505, the image capturing apparatus 101 and the printing apparatus 102 determine whether the role of the local apparatus is the P2P GO. If it is determined that the local apparatus is the P2P GO (YES in step S505), the process advances to step S506. If it is determined that the local apparatus is not the P2P GO, that is, the role of the local apparatus is the P2P Client (NO in step S505), the process advances to step S509. In this embodiment, since the image capturing apparatus 101 is the P2P GO, the process advances to step S506. Since the printing apparatus 102 is the P2P Client, the process advances to step S509.

In step S506, the communication apparatus on the P2P GO side (in this embodiment the image capturing apparatus 101) activates the DHCP server and waits for the DHCP IP address obtaining processing from the P2P Client. The process then advances to step S507. Note that at the time when the DHCP server is activated, the communication apparatus on the P2P GO side sets the local apparatus IP address in the network I/F.

In step S507, the communication apparatus on the P2P GO side (in this embodiment, the image capturing apparatus 101) determines whether the IP address distribution is complete. It is determined that the IP address distribution is complete (YES in step S507), the process advances to step S508. If it is determined that the IP address distribution is not complete (NO in step S507), the communication apparatus waits until the end of IP address distribution. In step S508, the communication apparatus on the P2P GO side (in this embodiment, the image capturing apparatus 101) executes the service start determination processing. This processing will be described later in detail with reference to the flowchart of FIG. 6.

In step S509, the communication apparatus on the P2P Client side (in this embodiment, the printing apparatus 102) activates the DHCP client, and the process advances to step S510. In step S510, the communication apparatus on the P2P Client side (in this embodiment, the printing apparatus 102) executes DHCP IP address obtaining processing to the P2P GO. In step S511, the communication apparatus on the P2P Client side (in this embodiment, the printing apparatus 102) executes service start determination processing. This processing will be described later in detail with reference to the flowchart in FIG. 6.

Processing in steps S505 to S507 and steps S509 and S510 corresponds to that in M407 to M410 of FIG. 4. After wireless LAN connection processing of M406, in M407, the communication apparatus on the P2P Client side (the printing apparatus 102) transmits the DHCP Discover. In M408, the communication apparatus on the P2P GO side (the image capturing apparatus 101) transmits a DHCP Offer upon reception of the DHCP Discover. In M 409, the communication apparatus on the P2P Client side (the printing apparatus 102) transmits a DHCP Request. In M410, the communication apparatus on the P2P GO side (the image capturing apparatus 101) transmits a DHCP Ack upon reception of the DHCP Request. By this series of operations, the IP address obtaining processing (S510) by the communication apparatus on the P2P Client side (the printing apparatus 102) is complete. After the image capturing apparatus 101 completes the DHCP IP address distribution processing to the printing apparatus 102 (that is, the DHCP Ack message is transmitted in M410), the process advances to step S508.

[Service Start Determination Processing]

The service start determination processing in steps S508 and S511 will be described in detail with reference to FIGS. 4 and 6.

In step S601, the image capturing apparatus 101 and the printing apparatus 102 determine whether the local apparatus is on the start side of the service data communication. If it is determined that the local apparatus is on the start side of the service data communication (YES in step S601), the process advances to step S602. If it is determined that the local apparatus is not on the start side of the service data communication (NO in step S601), the service start determination processing ends.

In step S602, the image capturing apparatus 101 and the printing apparatus 102 determine whether the local apparatus is operating as the P2P GO. The timer is started to delay the start of the data communication in consideration of a time interval for allowing the communication apparatus on the P2P client side (the printing apparatus 102) to perform the IP address overlap confirmation. If it is determined that the local apparatus is not operating as the P2P GO, that is, the local apparatus is operating as the P2P Client (NO in step S602), the process advances to step S603. In this embodiment, the image capturing apparatus 101 is operating as the P2P GO and is on the start side of the printing service data communication. The process advances to step S604. The printing apparatus 102 is operating as the P2P Client and is on the start waiting side of the printing service data communication. The process then advances to step S603

In step S603, the communication apparatus on the P2P Client side (the printing apparatus 102) executes IP address overlap confirmation processing. The IP address overlap confirmation is performed using a GARP (Gratuious ARP) (M411 in FIG. 4). In this embodiment, the GARP is transmitted three times at a predetermined time interval. If no response is received upon transmitting the GARP three times, it is determined that no communication apparatuses having identical IP addresses exist. The IP address obtained in step S510 is set in the network I/F. Note that the transmission count is not limited to 3, but can be set an arbitrary number. After the processing in step S603, the service start determination processing ends.

In step S604, the communication apparatus on the P2P GO side (the image capturing apparatus 101) determines whether the partner communication apparatus (the printing apparatus 102) performs the IP address overlap confirmation processing. The communication apparatus on the P2P GO side obtains, from the partner communication apparatus, information indicating whether the partner communication apparatus executes IP address overlap confirmation processing, as extension information of an arbitrary frame defined by the Wi-Fi Direct or wireless LAN. The communication apparatus on the P2P GO side performs determination based on this extension information. The obtaining processing may be executed in step S604 or in advance.

When it is determined that the partner communication apparatus does not perform the IP address overlap confirmation (NO in step S604), the service start determination processing ends. If it is determined that the partner communication apparatus performs the IP address overlap confirmation (YES in step S604), the process advances to step S605. When the communication apparatus on the P2P GO side does not obtain, from the partner communication apparatus, information indicating whether the partner communication apparatus performs the IP address overlap confirmation, the process may advance to step S605. Processing for determining whether the partner communication apparatus performs the IP address overlap conformation will be described in detail with reference to FIG. 8. In this embodiment, it is assumed that the image capturing apparatus 101 does not obtain information indicating whether the partner communication apparatus performs the IP address overlap confirmation. The process advances to step S605. Note that the determination processing in step S604 may be omitted. In this case, the determination processing in step S604 is not performed, and the process advances to step S605.

In step S605, the communication apparatus on the P2P GO side (the image capturing apparatus 101) starts a timer when starting the service data communication. The timer is started to delay the start of the data communication in consideration of a time interval for causing the communication apparatus on the P2P Client side (the printing apparatus 102) performs the IP address overlap confirmation. The timer value may be a predetermined value or a random value. The timer value may be obtained in advance from the partner communication apparatus of the service. In this case, the time value obtaining method may be performed using the Service Discovery. Similarly, the timer value may be obtained as the extension information of an arbitrary one of various kinds of frames defined by Wi-Fi Direct or wireless LAN. The time value may be notified by extending a new message by an upper layer in accordance with the wireless LAN. The present invention is not limited to these. After the activation of the timer, the process advances to step S606.

In step S606, the communication apparatus on the P2P GO side (the image capturing apparatus 101) determines whether the timer is up. If it is determined that the timer is up (YES in step S606), the service start determination processing is complete. If it is determined that the timer is not up (NO in step S606), the process waits until the timer is up. In this embodiment, the timer in the image capturing apparatus 101 is activated to delay the start of the service data communication. The start of the service is delayed by a time corresponding to the end of the timer. When the service state determination processing in FIG. 6 ends, the process advances to step S512 in FIG. 5. In step S512, the image capturing apparatus 101 and the printing apparatus 102 execute processing corresponding to the determination result in the service start determination processing and performs the service data communication.

The service data communication is started by causing the start side of the service data communication to transmit the data for the service. The service data communication start waiting side receives the start of data communication and executes data response processing.

In this embodiment, since the image capturing apparatus 101 is the start side of the printing service data communication and transmits the printing service data (M412). The printing apparatus 102 transmits response data (M413) of the printing service. The respective processing operations of FIGS. 4 and 5 have been completed.

As described above, according to this embodiment, the start timing of the data communication of the service with the partner communication apparatus is autonomously controlled on the basis of the role information of the local apparatus in the wireless network and information indicating whether the local apparatus is on the start side of the service data communication. Mismatching of the start timings of the service data communication between the local apparatus and the partner communication apparatus can be prevented. Data retransmission and transmission timeout can be suppressed.

[First Modification of Service Start Determination Processing]

Figure 6:
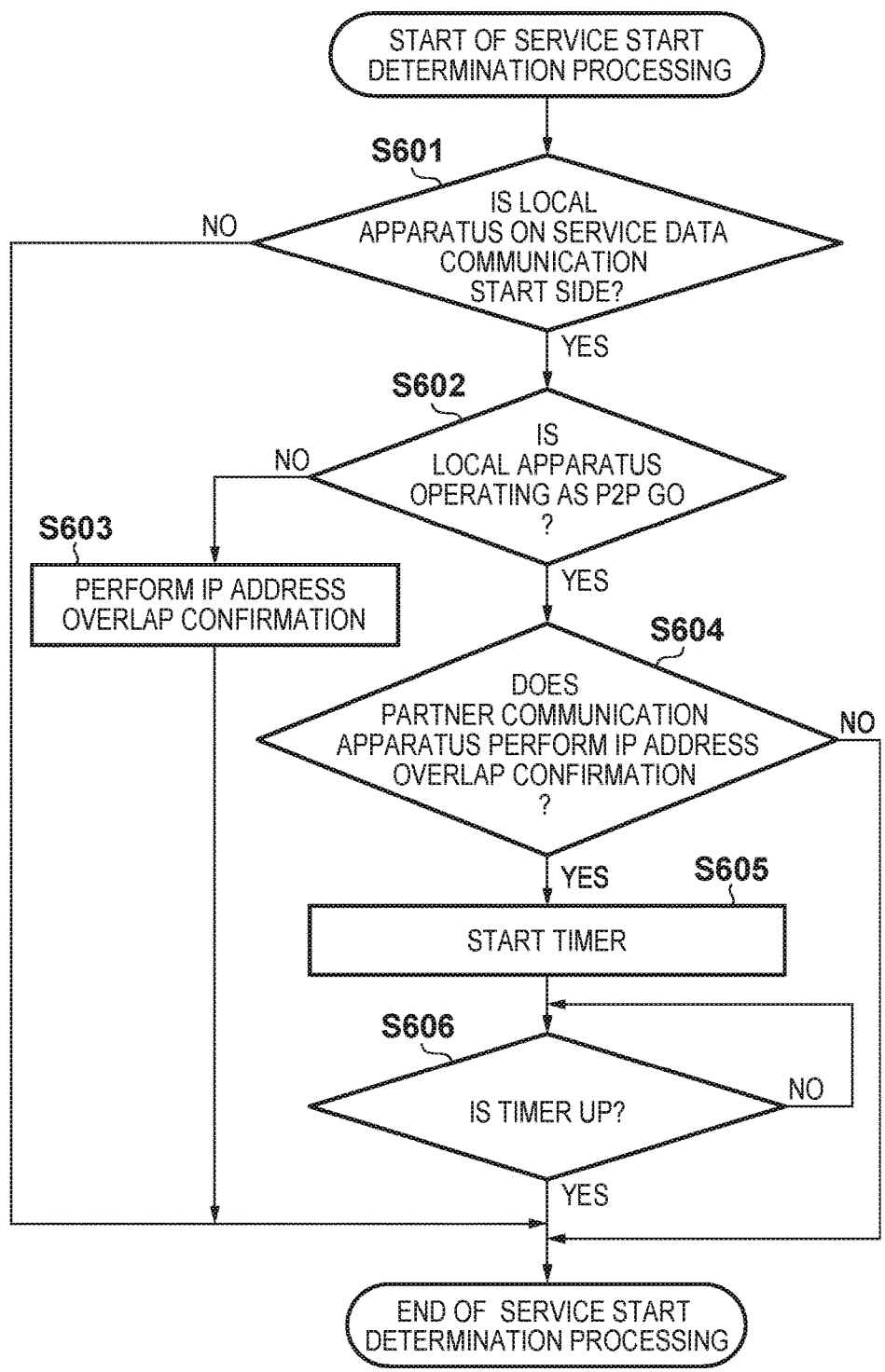
FIG. 6 is a flowchart showing the sequence of service start determination processing executed by the image capturing apparatus 101 and the printing apparatus 102 according to the first embodiment.

An example of the service start determination processing has been described using the flowchart of FIG. 6. The first modification of the service start determination processing according to this embodiment will be described with reference to FIG. 7.

Figure 7:
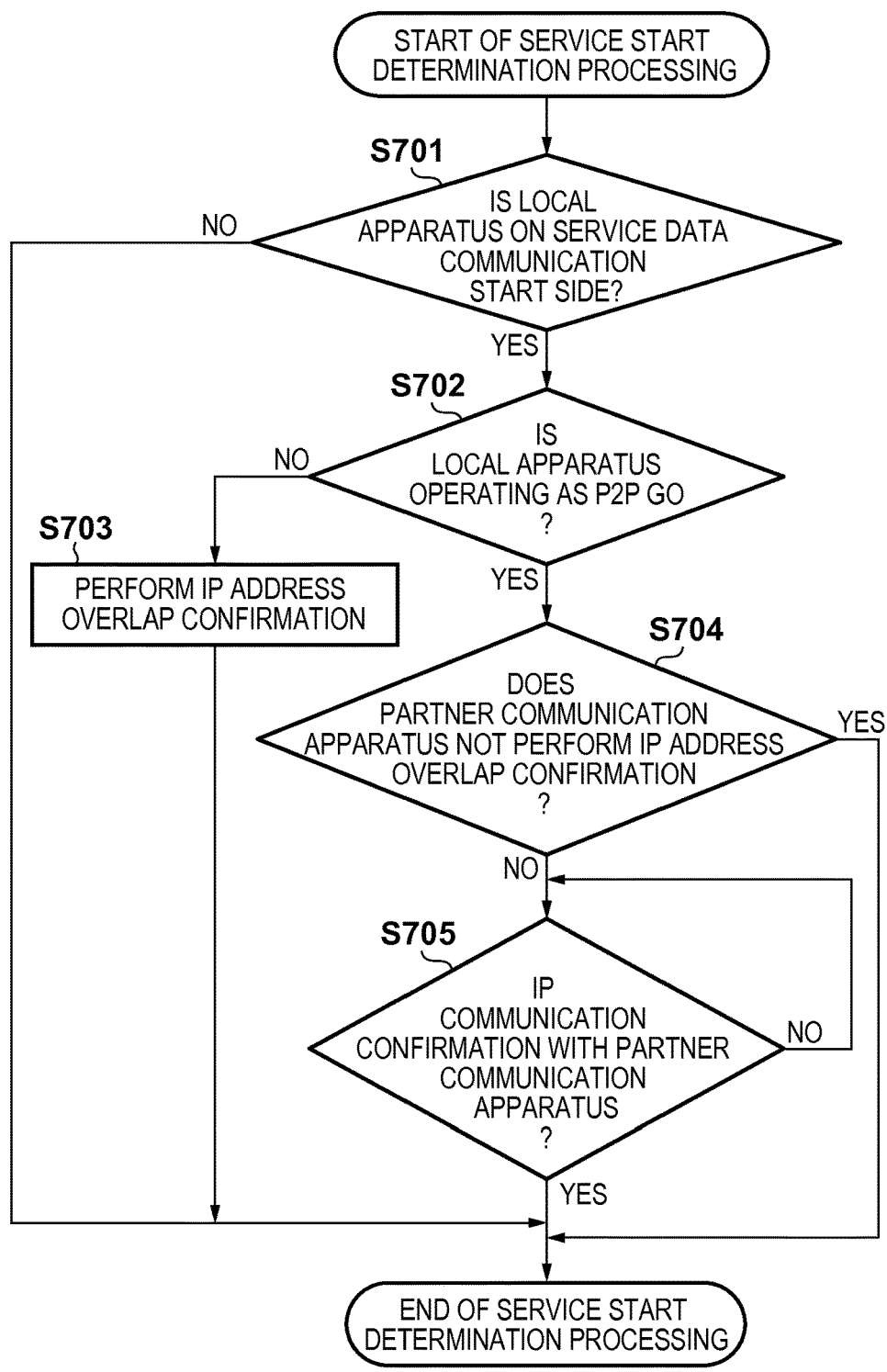
FIG. 7 is a flowchart showing the sequence of service start determination processing executed by the image capturing apparatus 101 and the printing apparatus 102 according to the first modification.

FIG. 7 is a flowchart showing the sequence of the service start determination processing executed by the image capturing apparatus 101 and the printing apparatus 102 according to the first modification. Processing in steps S701 to S704 is the same as that in steps S601 to S604, and a detailed description thereof will be omitted. Note that as in step S604, processing in step S704 need not be performed.

In step S705, the communication apparatus on the P2P GO side (the image capturing apparatus 101) determines whether IP communication with the partner communication apparatus (the printing apparatus 102) is possible. If it is determined that the IP communication is possible (YES in step S705), the service start determination processing ends.

Whether the IP communication is possible is determined by checking whether IP communication is possible for an IP address assigned to the partner communication apparatus by the DHCP server function. An echo request of an ICMP (Internet Control Message Protocol) is transmitted, and an echo replay is received, thereby confirming that the IP communication becomes possible. Alternatively, a message indicating that the IP communication becomes possible may be received from the partner communication apparatus.

Accordingly, after IP communication becomes possible more reliably than the timer value used in the flowchart of FIG. 6, the data communication can be performed.

[Second Modification of Service Start Determination Processing]

Figure 8:
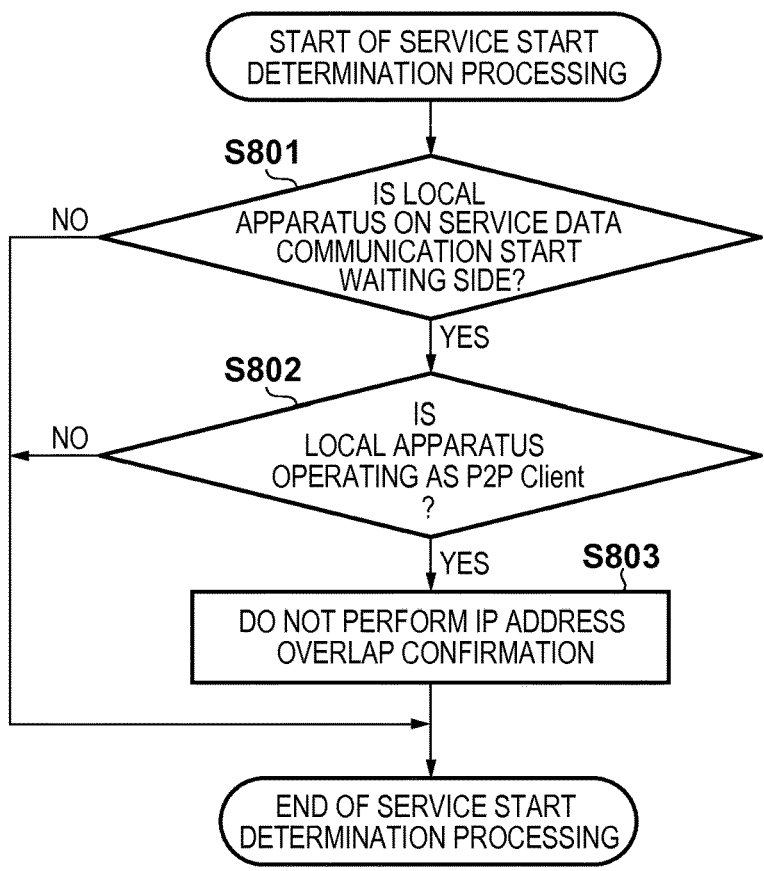
FIG. 8 is a flowchart showing the sequence of service start determination processing executed by the image capturing apparatus 101 and the printing apparatus 102 according to the second modification.

Similarly, the second modification of the service start determination processing according to this embodiment will be described with reference to FIG. 8. FIG. 8 is a flowchart showing the sequence of the service start determination processing executed by the image capturing apparatus 101 and the printing apparatus 102 according to the second modification.

In step S801, the image capturing apparatus 101 and the printing apparatus 102 determine whether the local apparatus is on the start waiting side of the service data communication. If it is determined that the local apparatus is on the start waiting side of the service data communication (YES in step S801), the process advances to step S802. If it is determined that the local apparatus is not on the start waiting side of the service data communication, that is, the local apparatus is on the start side of the data communication (NO in step S801), the service start determination processing ends. In this embodiment, since the printing apparatus 102 is on the start waiting side of the printing service data, the process advances to step S802. Since the image capturing apparatus 101 is on the start side of the printing service data communication, the processing ends.

In step S802, the image capturing apparatus 101 and the printing apparatus 102 determine whether the local apparatus is operating as the P2P Client. If it is determined that the local apparatus is operating as the P2P Client (YES in step S802), the process advances to step S803. If it is determined that the local apparatus is not operating as the P2P Client, that is, the local apparatus is operating as the P2P GO (NO in step S802), the service start determination processing ends. In this embodiment, the printing apparatus 102 is operating as the P2P Client. The process advances to step S803.

In step S803, the communication apparatus on the P2P Client side (the printing apparatus 102) determines not to perform the IP address overlap confirmation. In the Wi-Fi Direct, the IP address obtaining operation by the DHCP function is defined in the standard. Identical IP address networks (identical subnets) are limited within the wireless LAN network. The IP address of the terminal in the wireless LAN network is managed by the P2P GO DHCP server function.

For this reason, since IP address overlapping occurs at a low possibility, the IP address overlap confirmation is not performed as far as a peer-to-peer network such as a P2P group is formed. In this case, whether the IP address overlap confirmation is performed is notified to the partner communication apparatus as the extension information of an arbitrary frame defined by the Wi-Fi Direct or wireless LAN. This notification may be performed by processing in step S803 or may be made to the partner communication apparatus in advance. Note that the notification indicating whether the IP address overlap confirmation is performed may not be performed.

Accordingly, since the IP address overlap confirmation is not performed, the time until the start of service data communication can be shortened.

The apparatuses on the P2P GO side and the P2P Client side may be decided on the basis of information indicating whether one of the apparatuses is on the start side of the service. When the service start side serves as an apparatus on the P2P Client side, the IP address is set in the network I/F to start the service after the IP address overlap confirmation is performed. Mismatching between the service start timings can be prevented by the role decision of the wireless network.

(Second Embodiment)

Figure 9:
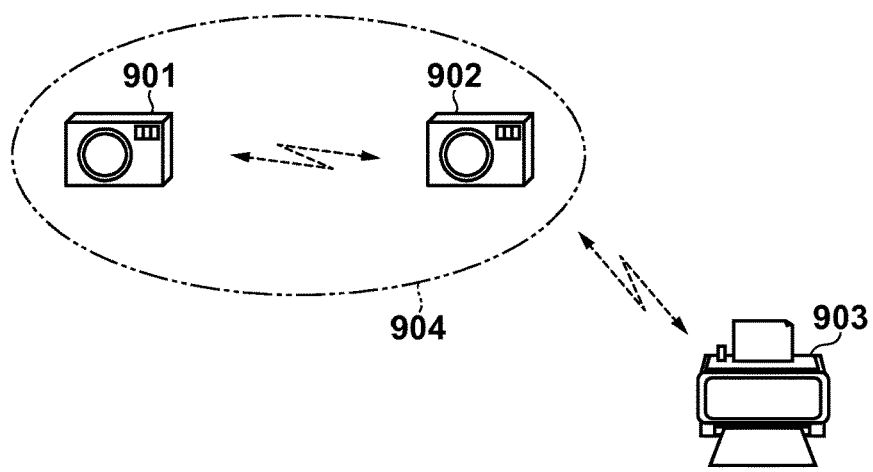
FIG. 9 is a view showing an example of the arrangement of a communication system according to the second embodiment.

The first embodiment has been described a case in which the new wireless network 103 is formed between the image capturing apparatus 101 and the printing apparatus 102. As shown in FIG. 9, the second embodiment will exemplify a case in which a wireless network 904 is already established between an image capturing apparatus 901 and an image capturing apparatus 902, and a printing apparatus 903 is connected to the wireless network 904. Note that the image capturing apparatus 902 establishes the wireless network 904 as the P2P GO, and the image capturing apparatus 901 is connected to the wireless network 904 as the P2P Client.

Figure 2:
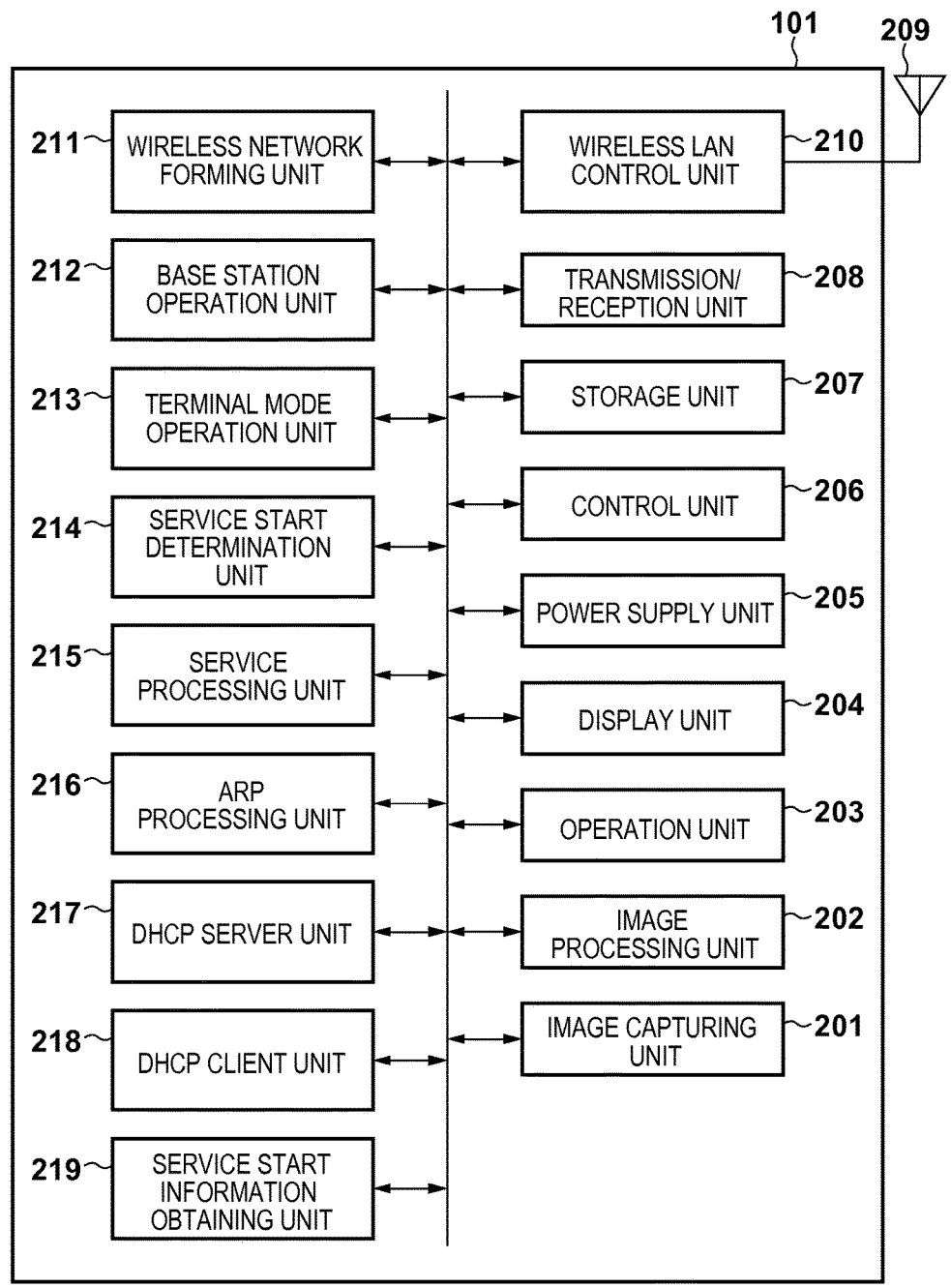
FIG. 2 is a functional block diagram of an image capturing apparatus 101 according to the first embodiment.
Figure 3:
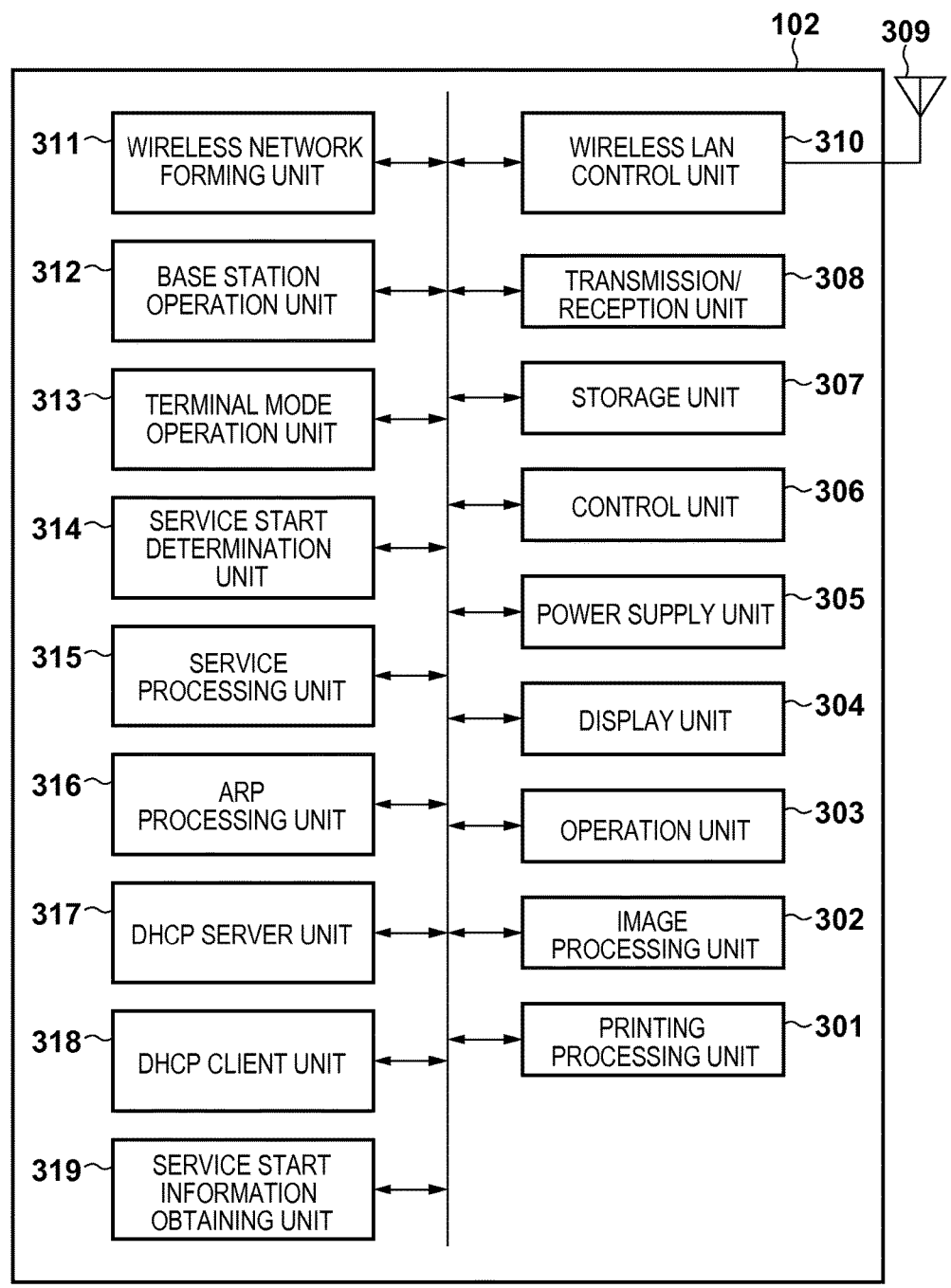
FIG. 3 is a functional block diagram of a printing apparatus 102 according to the first embodiment.

The function block diagram of the image capturing apparatus 901, the image capturing apparatus 902, and the printing apparatus 903 according to this embodiment is the same as those of the image capturing apparatus 101 in FIG. 2 and the printing apparatus 102 in FIG. 3, and a detailed description thereof will be omitted.

The processing contents of this embodiment will be described with reference to FIGS. 5, 8, and 10. FIG. 10 is a sequence chart between the apparatuses showing processing until the services are performed between the image capturing apparatus 901, the image capturing apparatus 902, and the printing apparatus 903 according to the second embodiment.

First of all, a user inputs a printing service start instruction between the image capturing apparatus 902 and the printing apparatus 903.

The image capturing apparatus 902 and the printing apparatus 903 receive a service start request in step S501, and the process advances to step S502.

In step S502, the image capturing apparatus 902 executes search processing (M1001 and M1002) for the communication partner as in the first embodiment. In this embodiment, since the image capturing apparatus 902 is activated as the P2P GO, it waits search from the partner apparatus serving as the search executing side. The printing apparatus 903 executes the search as a search executing side. The printing apparatus 903 executes the SCAN processing, the Service Discovery processing, and the like in step S502 and discovers the image capturing apparatus 902. The SCAN processing allows the image capturing apparatus 902 to recognize that the image capturing apparatus 902 is operating as the P2P GO. The printing apparatus 903 activates the terminal station mode for connecting to the wireless network 904 as the P2P Client.

Although the image capturing apparatus 902 is operating as the P2P GO, the image capturing apparatus 902 may execute the search processing as the search executing side because the image capturing apparatus 902 serves as the service start side. In this case, the image capturing apparatus 902 may perform the search while the data communication with the image capturing apparatus 901 is not executed yet. In the subsequent operations, the processing sequence between the image capturing apparatus 902 and the printing apparatus 903 is the same as in the first embodiment up to the processing of step S504, and a detailed description thereof will be omitted.

In step S504, since the image capturing apparatus 902 is already activated as the P2P GO, the Group Negotiation is skipped in the Wi-Fi Direct connection processing between the image capturing apparatus 902 and the printing apparatus 903. The image capturing apparatus 902 waits for Wi-Fi Direct connection from a new communication apparatus (the printing apparatus 903) in a state in which the P2P group is maintained.

When the Wi-Fi Direct connection processing (M1003) between the image capturing apparatus 902 and the printing apparatus 903 is complete, the image capturing apparatus 902 is the P2P GO (Yes in step S505). The process advances to step S506. Note that in this embodiment, since the image capturing apparatus 902 has already activated the DHCP server, the processing in step S506 is skipped, and the process advances to step S507. On the other hand, since the printing apparatus 903 has already been activated as the P2P Client (NO in step S505), the process advances to step S509. In step S510, IP address obtaining processing is executed (M1004-M1007). In this case, M1004 to M1007 are the same processing as in M407 to M410 of FIG. 4.

Since processing from step S507 executed by the image capturing apparatus 902 is the same as in the first embodiment, and a detailed description thereof will be omitted. Similarly, processing from step S510 executed by the printing apparatus 903 is the same as in the first embodiment, and a detailed description will be omitted.

Based on the service start determination processing, the printing service data communication is started between the image capturing apparatus 902 and the printing apparatus 903 (M1008-M1012). M1008 to M1012 are the same processing as in M411 to M413 of FIG. 4.

As an example of the service start determination processing, it is determined that the IP address overlap confirmation is not performed in step S803 of the first embodiment in the flowchart of FIG. 8.

However, in this embodiment, when a communication apparatus joins the already established P2P group, a case in which the IP address may be changed manually at the P2P Client terminal in the already established P2P group. In this embodiment, this case corresponds to a case in which, for example, the image capturing apparatus 901 has changed the IP address. When the IP address has been changed manually, the IP addresses may overlap between the image capturing apparatus 901 and the printing apparatus 903.

For this reason, in the determination processing of step S803, only when a new wireless LAN network (P2P group) is formed between the partner communication apparatus and the local apparatus, the IP address overlap confirmation may not be performed. That is, only when a one-to-one correspondence is reliable in the wireless LAN network, the IP address overlap confirmation is not performed. In a more practical example, assume that role information indicates that the host apparatus is operating as the client side, the local apparatus is in the start waiting side of the data communication, and a new wireless network is formed with the partner communication apparatus. In this case, it is determined that the overlap confirmation is not performed in the wireless network for the IP address obtained by the operation of the client side.

Whether a new wireless LAN network is formed is determined by whether the partner communication apparatus is operating as the P2P GO from the SCAN processing result. In this embodiment, since the printing apparatus 903 determines that the image capturing apparatus 902 is operating as the P2P GO in the SCAN processing, it is determined in step S803 that the IP address overlap confirmation is performed.

Note that in this embodiment, a case in which the start side (the image capturing apparatus 902) of the service data communication as the P2P GO has already established the wireless network 904 is formed is described. The present invention is not limited to this. The start waiting side (the printing side 903) of the service data communication may be operating as the P2P GO to form the wireless LAN network. For example, the wireless network 904 is formed between the image capturing apparatus 901 and the printing apparatus 903, and the image capturing apparatus 902 is connected to the wireless network 904. Even in this case, this embodiment can be applied.

Note that this embodiment has described a case in which the image capturing apparatus 902 operates as the P2P GO to form the wireless network 904. The present invention is not limited to this. The image capturing apparatus 901 may operate as the P2P GO to form the wireless network 904, and the image capturing apparatus 902 may operate as the P2P Client.

The image capturing apparatus 902 may form a new wireless LAN network (P2P group) between the image capturing apparatus 902 and the printing apparatus 903 while the image capturing apparatus 902 is kept connected to the wireless network 904. In this case, the wireless LAN network can be implemented by switching two wireless LAN networks on one wireless LAN I/F and communicating information in the image capturing apparatus 902 or providing a plurality of wireless LAN I/Fs and performing wireless LAN communication in each I/F. When another wireless LAN network different from the wireless network 904 is formed, the first embodiment is applied to it because the other wireless LAN network forms a new wireless LAN network (P2P group).

As has been described above, according to this embodiment, even if the P2P group has already been formed, the start timing of the service data communication with the partner communication apparatus can be autonomously controlled, thereby preventing mismatching between the service start timings.

Each embodiment described above has exemplified a case in which the wireless LAN complying with IEEE802.11 is applied to the wireless communication between the image capturing apparatus and the printing apparatus. The present invention is not limited to this. The wireless LAN communication can be implemented suing wireless communication media of, for example, wireless USB, MBOA, Bluetooth™, UWB, ZigBee, Near Field Communication, and the like.

MBOA stands for Multi Band OFDM Alliance. UWB includes wireless USB, wireless 1394, WINET, and the like.

Each embodiment described above has exemplified the infrastructure mode as the wireless LAN communication mode, but the present invention may be practiced in the ad hoc mode.

Each embodiment described above has exemplified a case in which Wi-Fi Direct is used in wireless LAN connection processing. However, the wireless LAN connection processing is not limited to this and can be implemented using another protocol processing. The present invention is also applicable to ordinary wireless LAN connection.

Each embodiment described above has exemplified a case in which DHCP is used to IP address assignment when forming the P2P group. An IP address may be assigned using another function. For example, an IP address is assigned to the partner communication apparatus using another medium different from wireless LAN. In this case, processing about DHCP of this embodiment is skipped, and service start determination processing starts after forming the P2P group.

IP address assignment is mainly applied to the IPv4 address. However, if an apparatus-specific IP address is used, the DHCP processing is skipped. For example, DHCP processing is skipped when the Ipv6 address is used. IP address system information (for example, corresponding information of the IPv4 address and Ipv6 address) is obtained from the partner communication apparatus, and whether the P2P group is formed using the apparatus-specific IP address may be determined in advance before formation of the P2P group. The IP address system information obtaining method is to obtain the IP address system information as the extension information of an arbitrary frame defined by Wi-Fi direct or wireless LAN. In this case, IP address overlap determination processing is skipped, and the service start determination processing is executed after formation of the P2P group.

Each embodiment described above has exemplified a case in which the GARP is used for the IP address overlap confirmation. However, the IP address overlap confirmation method is not limited to this. The overlap confirmation may be performed using another protocol. In this case, the IP address overlap confirmation processing is replaced with the overlap conformation using the other protocol to apply this embodiment.

In each embodiment described above, the start determination processing for starting the service data communication is executed. However, this start determination processing is not limited to the service data communication. For example, the start determination processing is applicable to all communications practiced on the IP layer, such as the negotiation processing and search processing which are required in advance to start a service.

According to the present invention, mismatching between the start timings in service data communication between the local apparatus and the partner communication apparatus can be prevented, and data retransmission and transmission timeout are suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-238268, filed Nov. 18, 2013, which is hereby incorporated by reference herein in its entirety.

What is claimed is:

1. A communication apparatus, comprising:
one or more processors; and
one or more memories storing instructions that, when executed by the one or more processors, cause the communication apparatus to:
obtain from another communication apparatus information relating to a service provided by the other communication apparatus, before forming a wireless network with the other communication apparatus;
form the wireless network with the other communication apparatus, after the information is obtained; and
delay, based on the obtained information, after addresses for performing a communication in the wireless network are assigned to the communication apparatus and the other communication apparatus, a start of data communication with the other communication apparatus, until an address overlap confirmation for confirming whether or not an IP (Internet Protocol) address of the other communication apparatus, which is provided by the communication apparatus, is overlapped in the wireless network is completed by the other communication apparatus.

2. The apparatus according to claim 1, wherein the communication apparatus controls a start timing of data communication with the other communication apparatus based on role information of the communication apparatus in the wireless network.

3. The apparatus according to claim 2, wherein the communication apparatus controls the timing associated with data communication based on the role information and information indicating whether the communication apparatus is on a sending device of the data communication.

4. The apparatus according to claim 2, wherein the communication apparatus obtains, from the other communication apparatus, start information about the timing associated with data communication in the other communication apparatus.

5. The apparatus according to claim 2, wherein the role information is information indicating whether the communication apparatus is operating in a base station mode or a terminal station mode in the wireless network.

6. The apparatus according to claim 2, wherein the role information indicates whether the communication apparatus is an apparatus operating as a server for assigning an IP address in the wireless network or the communication apparatus is an apparatus operating as a client for obtaining the IP address.

7. The apparatus according to claim 6, wherein when the communication apparatus operates as the server, the communication apparatus delays the timing associated with data communication as compared with a case in which the communication apparatus operates as the client.

8. The apparatus according to claim 7, further comprising a timer configured to delay the timing associated with data communication.

9. The apparatus according to claim 6, wherein when the communication apparatus operates as the server, the communication apparatus starts the data communication after predetermined communication is possible on an IP layer with the other communication apparatus.

10. The apparatus according to claim 6, wherein when the communication apparatus operates as the client and the communication apparatus is on a receiving device of the data communication, the communication apparatus does not perform an overlap confirmation in the wireless network for an IP address obtained by an operation of the client.

11. A control method for a communication apparatus, comprising:

an obtaining step of obtaining from another communication apparatus information relating to a service provided by the other communication apparatus, before forming a wireless network with the other communication apparatus;

a forming step of forming the wireless network with the other communication apparatus, after the information is obtained; and a control step of delaying, based on the obtained information, after addresses for performing a communication in the wireless network are assigned to the communication apparatus and the other communication apparatus, a start of data communication with the other communication apparatus, until an address overlap confirmation for confirming whether or not an IP (Internet Protocol) address of the other communication apparatus, which is provided by the communication apparatus, is overlapped in the wireless network is completed by the other communication apparatus.

12. A non-transitory computer-readable storage medium storing a computer program for causing a computer to execute a control method for a communication apparatus, comprising:

an obtaining step of obtaining from another communication apparatus information relating to a service provided by the other communication apparatus, before forming a wireless network with the other communication apparatus;

a forming step of forming the wireless network with the other communication apparatus, after the information is obtained; and a control step of delaying, based on the obtained information, after addresses for performing a communication in the wireless network are assigned to the communication apparatus and the other communication apparatus, a start of data communication with the other communication apparatus, until an address overlap confirmation for confirming whether or not an IP (Internet Protocol) address of the communication apparatus or the other communication apparatus, which is provided by the communication apparatus, is overlapped in the wireless network is completed by the other communication apparatus.

* * * * *